Nov. 14, 1950     G. D. ARNOLD     2,530,112
CENTRIFUGAL CYCLONE SEPARATOR
Filed Feb. 7, 1950
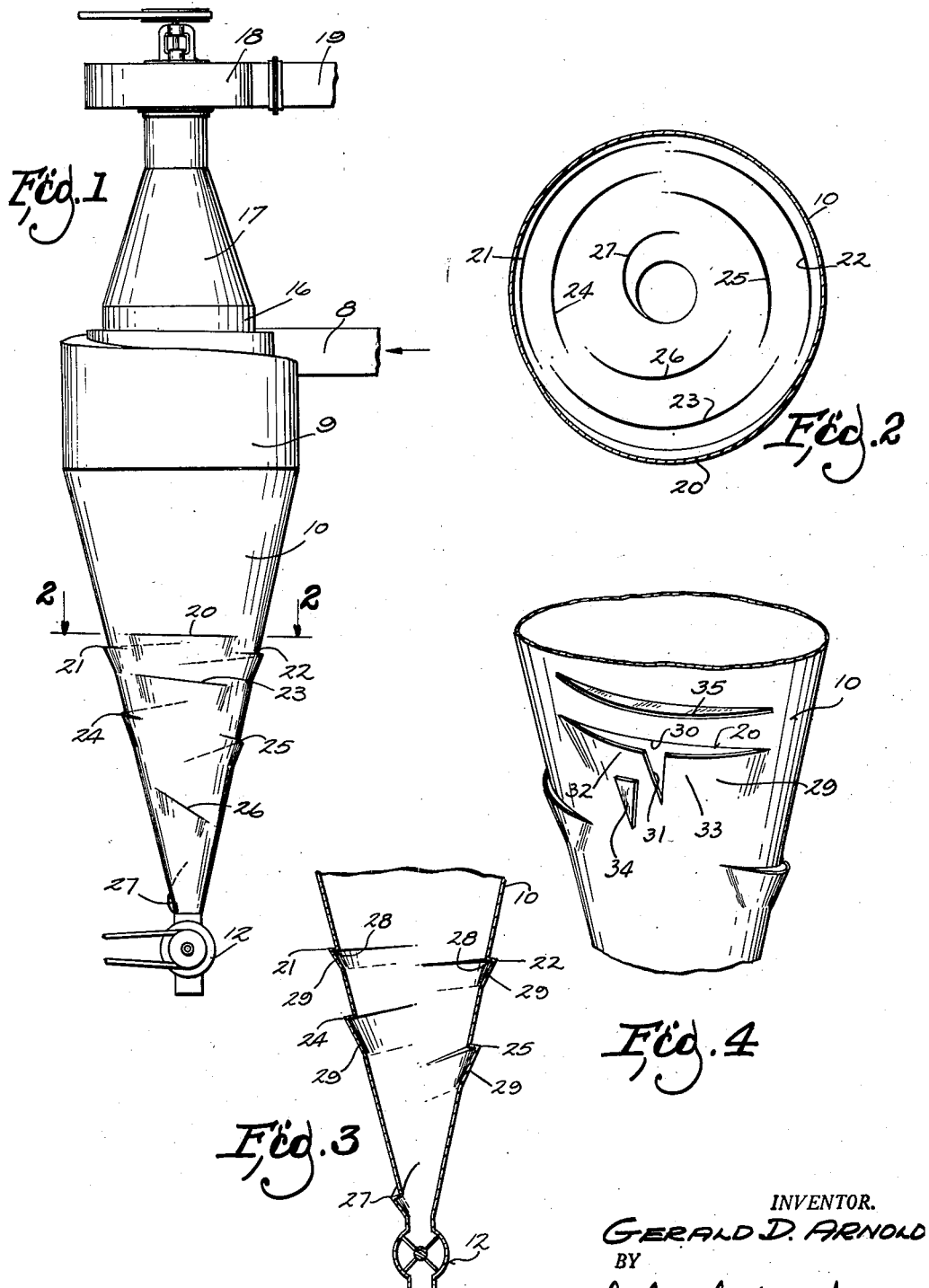
INVENTOR.
GERALD D. ARNOLD
BY
Wheeler, Wheeler & Wheeler
ATTORNEYS Patented Nov. 14, 1950

2,530,112

UNITED STATES PATENT OFFICE 2,530,112

CENTRIFUGAL CYCLONE SEPARATOR

Gerald D. Arnold, Wauwatosa, Wis.

Application February 7, 1950, Serial No. 142,918

14 Claims. (Cl. 183—85)

This invention relates to improvements in centrifugal cyclone separators.

It is a primary object of the invention to bring about the continued movement of separated solids out of the small end of the separator cone without bridging across the cone, as the solids tend to do when efficient separation of solids from the moving air occurs.

In using the kinetic energy of the whirling solids to effect their axial movement downwardly through the small end of the cone, it is my further purpose to provide an undercut form of screw or thread in the wall of the separator which will assist in such axial movement of the solids without constituting a base or support upon which solids may lodge to cause bridging and unsanitary conditions. The matter of sanitation is an important feature, inasmuch as the centrifugal separator herein disclosed is expressly adapted for handling airborne food solids such as powdered eggs, powdered milk, and the like.

In my abandoned application 466,576, filed November 23, 1942 and entitled "Centrifugal Separators", and in co-pending, allowed application 764,860, entitled "Centrifugal Cyclone Separators", filed July 30, 1947, and also abandoned, and of which the present application is a continuation in part, I disclosed a form of undercut screw or thread leaving no upwardly exposed surface upon which material might lodge. I further suggested that this screw or thread have a progressively increasing pitch toward the smaller end of the separator cone. The present device has these advantages and, in addition, it eliminates one further source of bridging in that the screw or thread is now discontinuous, comprising separate and mutually spaced portion which extend along a predetermined helical path but are not connected, each with the other, whereby a smooth and uninterrupted space of conical wall intervenes between consecutive portions of the thread. It is found that making the thread in separate discontinuous portions eliminates the last tendency toward bridging and eliminates a further difficulty in the matter of "spilling", as will hereinafter be explained.

While, for most purposes, the discontinuous undercut thread elements lie along the same predetermined spiral helical path, it is advantageous, for some purposes, and particularly where the material to be separated constitutes, or includes, extremely fine matter, to offset the successive undercut thread portions rearwardly from the projected helical-spiral line of preceding thread portions to pick up material which, on release from the preceding thread, may have tended to resume horizontal rotation.

In the drawings:

Figure 1 is a view in side elevation of a separator embodying the invention.

Figure 2 is a view taken in cross section in the line 2—2 of Figure 1.

Figure 3 is a view taken in vertical axial section through the device of Figure 1.

Figure 4 is a fragmentary detailed view on an enlarged scale showing in perspective the separate component parts required in one method of fabricating a centrifugal separator cone embodying the invention.

Figure 5 is a side elevational view on an enlarged scale showing a modified embodiment of the invention.

As in the device of application No. 466,576 above referred to, I may make the threaded lower end of the separator cone as a separate article of manufacture for attachment to an existing separator to improve the efficiency thereof. It will, however, be described as a complete entity.

The airborne solids requiring separation arrive through the tangential inlet pipe 8 into admission chamber 9, from which the conically tapering wall of the separator extends downwardly at 10. The use of the belt driven rotary valve 12 for passing solids while excluding air from the bottom of the separator is entirely optional.

The air admitted to the separator chamber leaves through the sleeve 16 and the tapered fitting 17 to the inlet of blower 18, which has a tangential discharge pipe at 19.

The discontinuous spiral undercut feed screw with which this invention is particularly concerned begins with the substantially horizontal portion 20 at approximately the level indicated by the section line 2—2, this being the approximate point at which the vortex of air reverses itself to flow toward the discharge sleeve 16, leaving the solids to continue downwardly in the cone 10. The next independent spiral thread element 21 has a relatively slight pitch and commences below the thread element 20 and about a third of the way around the cone. At the end of thread element 21 there is again and unthreaded smooth wall surface of about 120° before the third thread element 22 is encountered. This has a greater pitch than element 21. The fourth element 23 has a still greater pitch and the pitch of elements 24, 25, 26 and 27 progressively increases as shown. Each element is spaced for about 120° in both directions from the nearest adjacent elements in the spiral path upon which the solids travel. Each thread element may also extend about 120°, more or less, around the periphery of the cone. All of the feed screw portions, however, are preferably disposed in a single imaginary line of progressively increasing helical pitch.

At its ends, each of the feed screw elements runs out to merge smoothly with the adjacent conical surfaces. At its center each of the screw elements provides an overhanging ledge 28 (see Fig. 3) of maximum width. The inner edge of this overhanging ledge falls at all points in the projected conical surface of the separator body 10. Its outer margin is spaced away from the projected cone of the body and is joined therewith by a flaring wall 29 which, like the ledge, reaches a maximum displacement from the cone near the middle of each of the screw portions but runs out to merge smoothly with the coned wall at the ends of the thread portions. This is clearly shown in Figures 1, 3 and 4.

The conical wall with the discontinuous inverted shoulders or screw threads may, obviously, be cast or may be formed with proper dies. In addition, however, it may be fabricated in the manner shown in Figure 4. The conical wall may be slit at 30 and 31 and the portions 32 and 33 displaced outwardly. The triangular insert 34 is then set into the notch between the wall sections 32 and 33 and a crescent shaped insert 35 is fitted into the gap between the resulting wall 29 and the conical wall of the chamber 10 to provide the overhanging ledge portion of the thread. The relative dimensions of the thread are exaggerated in the drawing. Actually the offset or overhang of the ledge 35 is relatively slight in proportion to the diameter of the separator chamber.

The radial projection of the ledge 35 being slight, it will be apparent that the change of direction involved in the movement of the separated solids between the conical portion of the wall and any one of the flaring portions 29 will likewise be very slight indeed. In actual practice there is no tendency whatever for the material to lodge on the flaring portion 29 of the wall, nor will it bridge in view of the fact that from time to time the flaring portion gradually disappears and the material is restored to the unflared and perfectly smooth conical tapered surface of the wall 10.

Even more important is the fact that there will be little or no spilling of the material from one portion of the thread to the portion therebeneath. If the thread is continuous, it is found that the heavier portions of the material will accumulate in the thread beneath the overhanging ledge and out of direct contact with the air stream from which the solids derive their movement. The friction between the solids and the wall of the separator is relatively high and, particularly where the solids wedge beneath an overhanging ledge, they may come to rest completely or substantially completely and will then tend to fall outwardly and downwardly. When this spilling occurs, the finer solids will be picked up by the vortex of air leaving the separator, thus reducing the efficiency of separation.

The difficulty is avoided by the discontinuous thread because, at short intervals, all materials are necessarily brought out to the surface and again exposed to the air stream to receive new propulsive effort therefrom. Moreover, due to the form of the discontinuous thread, it is very shallow at all points and only reaches its maximum depth at its exact center. Consequently, it is only possible for a relatively thin layer of material ever to move beneath the ledge and this but momentarily. To the extent that any of the material does lose its forward momentum and spill downwardly in the throat of the separator, the layer of material involved is relatively minute and there is little or no tendency for any portion of the material to be reentrained in the vortex.

There is just enough extent of the discontinuous separate thread portions so that the whirling mass of solids will, from time to time, receive successive impulses progressively changing its direction toward an axial direction. These impulses are short in duration because of the discontinuous nature of the thread portions which cause them. After each impulse the whirling material continues free of any influencing factor and free of any contact which can induce bridging or spilling. Accordingly, all material moves smoothly and continuously to the outlet.

While reference has been made to the preferred disposition of the various discontinuous portions of the thread upon a common imaginary helical line, it will be apparent that this is not at all essential by reason of the very fact that the thread is discontinuous. Ideally there is a preferred relationship between the pitch of the thread and the velocity of the material at each given point. This may, however, be impossible to ascertain and it may fluctuate. By giving the material successive impulses, each of short duration, it becomes less important what the precise pitch of the thread may be.

For best results the precise lever at which the discontinuous feed screw elements should commence in the lower portion of the cone may desirably be adjusted according to the weight of the material to be separated and the speed of the pneumatic current by which it is conveyed into the separator. The same factors will govern, for best results, the pitch or angularity of the cone. The greater the velocity of the gases, the less should be, in general, the angle between the wall of the cone and its axis. For extremely fine material it may be necessary to use high current velocity and a small radius separator to achieve maximum angular velocity and full separation. Under such conditions the discontinuous feed screw of this invention is of maximum importance to prevent bridging or spilling, and assuring continued delivery of all the solids with maximum efficiency.

The device shown in Fig. 5 exemplifies the fact that, as noted above, it is not essential that the various discontinuous portions of the thread be disposed upon the same imaginary helical line. In fact, where the material to be separated is extremely fine, it may be advantageous to offset each successive undercut thread portion from the projected line of the thread portion next preceding it. In the device of Fig. 5, the first undercut thread portion 37 has relatively slight pitch. It begins at 38 and runs out at 39. The second undercut thread portion 40 begins at 41 and runs out at 42 and it is significant that in this embodiment, the thread portion 40 is not only not in the projected helical line of thread portion 37, but is offset upwardly for a sufficient distance so that its beginning at 41 may actually be slightly above the horizontal plane in which the terminus 39 of thread portion 37 is located. This is because of the tendency of the material at this point in the separator, to move circumferentially in a horizontal plane. Despite the downward momentum given to the material by thread portion 37, the tendency of the material to level out upon leaving such thread portion might, if the material were extremely light, be sufficient to overcome at once all downward momentum thus permitting the material, or some of it, to miss contact with the undercut thread 40 if such thread were not rearwardly offset as indicated. By having the receiving end 41 of thread 40 located at a slightly higher level than the discharge end 39 of thread 37, I assure that even the lightest material will be picked up by the thread 40 and acted thereon to impart further downward movement.

The receiving end 43 of the next thread 44, while offset rearwardly from the helical projection of the line of thread 40, is not above the plane of the delivery end 42 of thread 40, but is substantially in the same plane. Similarly, the receiving end 45 of the undercut thread 46 may be substantially in the same plane as the delivery end 47 of thread 44. From this point on, however, while the offset is always rearwardly from the projected helical line of the preceding thread, the increasing pitch of the threads is such that each thread commences substantially below te delivery end of the next preceding thread section. Thus the receiving end 48 of thread 49 is below the delivery end 50 of thread 46. The delivery end 51 of thread 49 is definitely above the receiving end 52 of thread 53 and the delivery end 54 of thread 53 is even more pronouncedly above the receiving end 55 of thread 56.

As the pitch increases, the downward offset increases, since the material has, by now, quite a pronounced downward component of movement. The angular velocity has also increased. Thus, it cannot possibly level off in the short space which it travels from the time it leaves one thread until it is engaged by the next. However, while each successive thread starts well below the delivery end of the next preceding thread, each successive thread is nevertheless offset slightly to the rear, or upwardly from, the projected helical line of the next preceding thread.

I claim:

1. A frusto-conical tapering wall provided internally with mutually spaced, discontinuous, spirally pitched thread elements having inner margins arcuate and remote from the axis of said wall, said wall being substantially continuous and adapted for use for confining material in a cyclone type separator and said thread elements being positioned for intermittent action on whirling solids confined within the wall to effect axial movement thereof.

2. In a cyclone type separator chamber, a peripherally closed frusto-conical wall provided at angularly spaced intervals with separate discontinuous thread portions of progressively increasing pitch toward the smaller end of such wall, said portions having inner concavely arcuate margins remote from the axis of said wall and running out and merging with the wall and being adapted to confine and to act intermittently upon material whirling within said chamber for progressive change of direction of movement of such material toward a direction axially of said chamber.

3. The device of claim 2 in which all of said thread portions are disposed upon a single imaginary line representing a single thread of progressively increasing pitch.

4. In a cyclone type separator chamber, the combination with a peripherally closed and continuous frusto-conically tapering wall, of a plurality of mutually spaced discontinuous feed threads each comprising an undercut shoulder in said wall and flaring wall portions leading from the outer edges of each such shoulder back toward said wall, said shoulders and flaring wall portions having limited angular extent about the wall and gradually decreasing in displacement to merge smoothly with the wall at both ends.

5. The device of claim 4 in which the discontinuous feed thread portions have successively increasing pitch.

6. In a cyclone type separator, the combination with a frusto-conically tapering wall, of feed screw means comprising separate, mutually spaced, discontinuous, screw portions having helical pitch towards the smaller end of said wall, each such portion comprising an overhanging shoulder extending about the wall and offset outwardly from the wall portion thereabove and having a maximum outward offset intermediate its ends and thence tapering to merge smoothly with the wall at its ends, said wall having a slightly flaring portion immediately beneath each said shoulder corresponding in displacement to the shoulder and in closed connection with the shoulder and merging downwardly and laterally with unshouldered portions of said wall.

7. The device of claim 6 in which successive feed screw portions are of progressively increased pitch.

8. The device of claim 6 in which all of said feed screw portions lie upon a single, imaginary, helical-spiral line of progressively increasing pitch.

9. The device of claim 6 in which each such flaring wall portion has a V-shaped central insert and a top edge offset from said frusto-conical wall, each shoulder comprising a crescent-shaped insert extending from the frusto-conical wall to the offset edge of the flaring wall portion.

10. A cyclone separator wall of generally circular cross section provided internally with mutually spaced, discontinuous, spirally pitched thread elements having inner margins arcuate and remote from the axis of the wall, the said thread elements being positioned for intermittent action upon whirling solids confined within the wall to effect axial movement thereof, the thread elements being of progressively increasing pitch and successive elements being offset axially rearwardly from the projected lines of respectively next preceding thread elements.

11. In a cyclone type separator chamber, a peripherally closed frusto-conical wall provided at angularly spaced intervals with separate discontinuous undercut thread portions of a pitch progressively increasing toward the smaller end of the wall, the said thread portions having concavely arcuate inner margins remote from the axis of said wall and running out and merging with the wall and being adapted to confine and to act intermittently upon material whirling within said chamber for progressive change of direction of movement of such material toward a direction axially of said chamber, successive thread portions being respectively offset toward the larger end of said wall from the respectively projected pitch lines of the next preceding thread portions.

12. The device of claim 11 in which one of the discontinuous thread portions of relatively slight pitch commences closer to the large end of said wall than the delivery end of the next preceding thread portion.

13. The device of claim 11 in which certain thread portions of said wall, while offset toward the larger end of the wall from the projected spiral direction of preceding thread portions, nevertheless have their respective receiving ends disposed closer to the small end of the wall than are the respective delivery ends of respective preceding thread portions.

14. The device of claim 11 in which a relatively low pitched thread portion of said wall has its receiving end closer to the large end of the wall than the delivery end of the next preceding thread portion, relatively higher-pitched thread portions of said wall having their receiving ends closer to the small end of the wall than the delivery ends of respectively next preceding thread portions notwithstanding the offset of said successive higher-pitched thread portions rearwardly from the projected lines of the respectively preceding thread portions.

GERALD D. ARNOLD.

REFERENCES CITED

The following references are of record in the file of this patent:

UNITED STATES PATENTS

| Number | Name | Date |
|---|---|---|
| 164,306 | Kelsaw | June 8, 1875 |
| 415,368 | Reitz | Nov. 19, 1889 |
| 468,935 | Morse | Feb. 16, 1892 |
| 2,010,128 | Arnold | Aug. 6, 1935 |
| 2,153,026 | Ringius | Apr. 4, 1939 |

Certificate of Correction

Patent No. 2,530,112                             November 14, 1950

GERALD D. ARNOLD

It is hereby certified that error appears in the above numbered patent requiring correction as follows:

In the drawing, Sheet 2, containing Fig. 5, as shown below should be inserted as part of the Letters Patent—

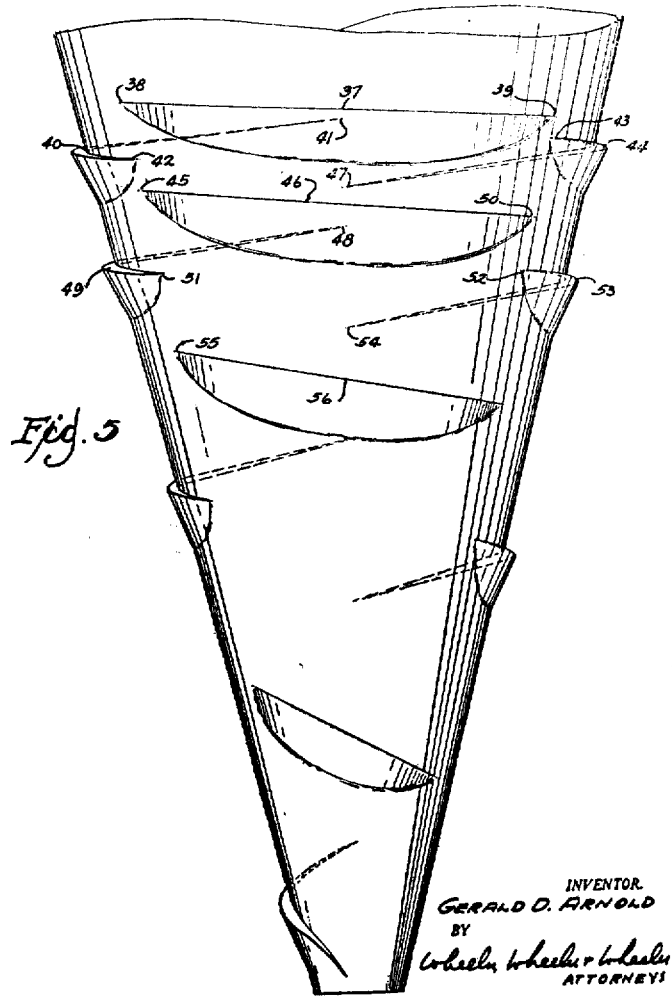

in the heading to the present sheet of drawing, line 3, to the right of the filing date, insert *2 Sheets-Sheet 1*; in the printed specification, column 1, line 25, for "764,860" read *764,680*; column 2, line 47, for the word "and" read *an*; column 5, line 27, for "te" read *the*;

and that the said Letters Patent should be read as corrected above, so that the same may conform to the record of the case in the Patent Office.

Signed and sealed this 6th day of February, A. D. 1951.

[SEAL]

THOMAS F. MURPHY,
*Assistant Commissioner of Patents.*